(12) United States Patent
Basu et al.

(10) Patent No.: US 6,253,175 B1
(45) Date of Patent: Jun. 26, 2001

(54) WAVELET-BASED ENERGY BINNING CEPSTAL FEATURES FOR AUTOMATIC SPEECH RECOGNITION

(75) Inventors: Sankar Basu, St. Tenafly, NJ (US); Stephane H. Maes, Danbury, CT (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/201,055

(22) Filed: Nov. 30, 1998

(51) Int. Cl.[7] .................................................. G10L 15/00
(52) U.S. Cl. ........................... 704/231; 704/237; 704/245
(58) Field of Search .................................. 704/231, 236, 704/237, 245, 250

(56) References Cited

U.S. PATENT DOCUMENTS

| | | | |
|---|---|---|---|
| 5,398,302 | * | 3/1995 | Thrift ..................................... 706/25 |
| 5,899,973 | * | 5/1999 | Bandara et al. ..................... 704/256 |
| 5,956,671 | * | 9/1999 | Ittycheriah et al. ................. 704/203 |

OTHER PUBLICATIONS

Daubechies et al., "A Nonlinear Squeezing of the Continuous Wavelet Transform Based on Auditory Nerve Models," Wavelets in Medicine and Biology, vol. 20, pp. 527–546, 1996.

Stephane H. Maes, "Robust Speech and Speaker Recognition Using Instantaneous Frequencies and Amplitudes Obtained With Wavelet–Derived Synchrosqueezing Measures," pp. 1–16, Mar. 1996.

Stephane H. Maes, "Fast Quasi–Continuous Wavelet Algorithms for Analysis and Synthesis of One–Dimensional Signals," SIAM J. Appl. Math., vol. 57, No. 6, pp. 1763–1801, Dec. 1997.

* cited by examiner

Primary Examiner—Fan Tsang
Assistant Examiner—Michael N. Opsasnick
(74) Attorney, Agent, or Firm—F. Chau & Associates, LLP

(57) ABSTRACT

Systems and methods for processing acoustic speech signals which utilize the wavelet transform (and alternatively, the Fourier transform) as a fundamental tool. The method essentially involves "synchrosqueezing" spectral component data obtained by performing a wavelet transform (or Fourier transform) on digitized speech signals. In one aspect, spectral components of the synchrosqueezed plane are dynamically tracked via a K-means clustering algorithm. The amplitude, frequency and bandwidth of each of the components are, thus, extracted. The cepstrum generated from this information is referred to as "K-mean Wastrum." In another aspect, the result of the K-mean clustering process is further processed to limit the set of primary components to formants. The resulting features are referred to as "formant-based wastrum." Formants are interpolated in unvoiced regions and the contribution of unvoiced turbulent part of the spectrum are added. This method requires adequate formant tracking. The resulting robust formant extraction has a number of applications in speech processing and analysis including vocal tract normalization.

20 Claims, 11 Drawing Sheets

WAVELET-BASED ENERGY BINNING CEPSTAL FEATURES FOR AUTOMATIC SPEECH RECOGNITION

BACKGROUND

1. Technical Field

The present application relates generally to speech recognition and, more particularly, to an acoustic signal processing system and method for providing wavelet-based energy binning cepstral features for automatic speech recognition.

2. Description of the Related Art

In general, there are many well-known signal processing techniques which are utilized in speech-based applications, such as speech recognition, for extracting spectral features from acoustic speech signals. The extracted spectral features are used to generate reference patterns (acoustic models) for certain identifiable sounds (phonemes) of the input acoustic speech signals.

Figure 1:
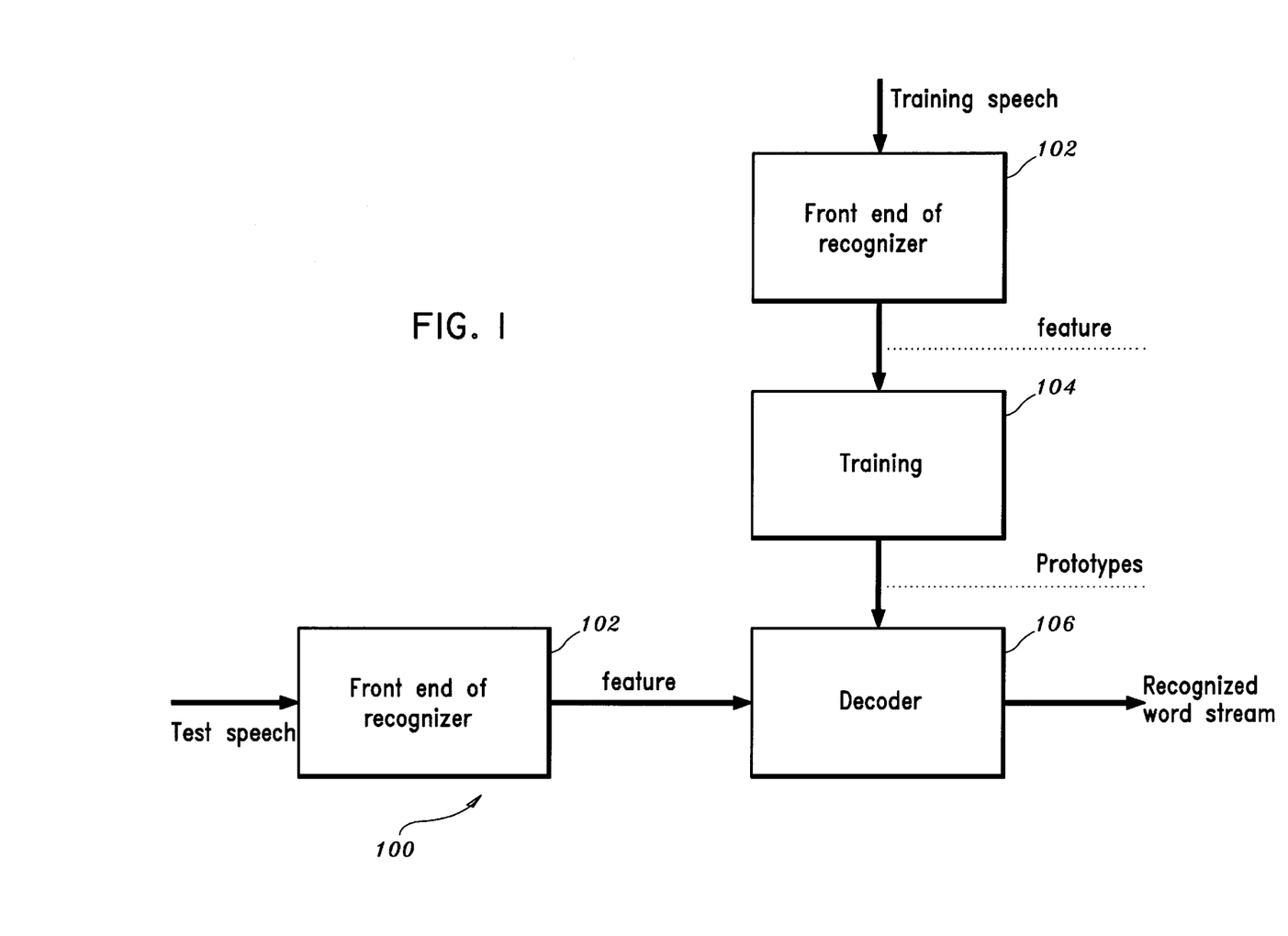
FIG. 1 is a block diagram which illustrates a generalized speech recognition system in accordance with the prior art.

Referring now to FIG. 1, a generalized speech recognition system in accordance with the prior art is shown. The speech recognition system 100 generally includes and acoustic front end 102 for preprocessing of speech signals, i.e. input utterances for recognition and training speech. Typically, the acoustic front end 102 includes a microphone to convert the acoustic speech signals into an analog electrical signals having a voltage which varies over time in correspondence to the variations in air pressure caused by the input speech utterances. The acoustic front end also includes an analog-to-digital (A/D) converter for digitizing the analog signal by sampling the voltage of the analog waveform at a desired "sampling rate" and converting the sampled voltage to a corresponding digital value. The sampling rate is typically selected to be twice the highest frequency component (which, e.g., is 16 khz for pure speech or 8 khz for a communication channel having a 4 kz bandwidth).

Digital signal processing is performed on the digitized speech utterances (via the acoustic front end 102) by extracting spectral features to produce a plurality of feature vectors which, typically, represent the envelope of the speech spectrum. Each feature vector is computed for a given frame (or time interval) of the digitized speech, with each frame representing, typically, 10 ms to 30 msec. In addition, each feature vector includes "n" dimensions (parameters) to represent the sound within the corresponding time frame.

The system includes a training module 104 which uses the feature vectors generated by the acoustic front end 102 from the training speech to train a plurality of acoustic models (prototypes) which correspond to the speech baseforms (e.g., phonemes). A decoder 106 uses the trained acoustic models to decode (i.e., recognize) speech utterances by comparing and matching the acoustic models with the feature vectors generated from the input utterances using techniques such as the Hidden Markov Models (HMM) and Dynamic Time Warping (DTW) methods disclosed in "Statistical Methods For Speech Recognition", by Fred Jelinek, MIT Press, 1997, which are well-known by those skilled in the art of speech recognition.

Conventional feature extraction methods for automatic speech recognition generally rely on power spectrum approaches, whereby the acoustic signals are generally regarded as a one dimensional signal with the assumption that the frequency content of the signal captures the relevant feature information. This is the case for the spectrum representation, with its Mel or Bark variations, the cepstrum, FFT-derived (Fast Fourier Transform) or LPC-derived (Linear Predictive Coding), LPC derived features, the autocorrelation, the energy content, and all the associated delta and delta-delta coefficients.

Cepstral parameters are, at present, widely used for efficient speech and speaker recognition. Basic details and justifications can be found in various references: J. R. Deller, J. G. Proakis, and J. H. L. Hansen, "Discrete Time Processing of Speech Signals", Macmillan, New York, N.Y., 1993; S. Furui, "Digital Speech Processing, Synthesis and Recognition", Marcel Dekker, New York, N.Y., 1989; L. Rabiner and B-H. Juang, "Fundamentals of Speech Recognition", Prentice-Hall, Englewood Cliffs, N.J., 1993; and A. V. Oppenheim and S.W. Schaffer, "Digital Signal Processing", Prentice-Hall, Englewood Cliffs, N.J., 1975. Originally introduced to separate the pitch contribution from the rest of the vocal cord and vocal tract spectrum, the cepstrum has the additional advantage of approximating the Karhunen-Loéve transform of speech signal. This property is highly desirable for recognition and classification.

Speech production models, coding methods as well as text to speech technology often lead to the introduction of modulation models to represent speech signals with primary components which are amplitude-and-phase-modulated sine functions. For example, the conventional modulation model (MM) represents speech signals as a linear combination of amplitude and phase modulated components:

$$f(t) = \sum_{k=1}^{K} A_k(t)\cos[\theta_k(t)] + \eta(t)$$

where Ak(t) is the instantaneous amplitude, $w_k(t)=d/dt\theta_k(t)$ is the instantaneous frequency of component (or formant) k, and where N(t) takes into account the errors of modelling. In a more sophisticated model, the components are viewed as "ribbons" in the time-frequency plane rather than curves, and instantaneous bandwidths $\Delta w_k(t)$ are associated with each component. These parameters can be extracted and processed to generate feature vectors for speech recognition.

Other methods which characterize speech with phase-derived features are, for example, the EIH (Ensemble Interval Histogram) (see 0. Ghitza, "Auditory Models and Human Performances in Tasks Related to Speech Coding and Speech Recognition", IEEE Trans. Speech Audio Proc., 2(1):pp. 115–132, 1994), SBS (in-synchrony Bands Spectrum) (see 0. Ghitza, "Auditory Nerve Representation Criteria For Speech Analysis/Synthesis", IEEE Trans. ASSP, 6(35):pp 736–740, June 1987), and the IFD (Instantaneous-Frequency Distribution) (see D. H. Friedman, "Instantaneous-Frequency Distribution Vs. Time: An Interpretation of the Phase Structure of Speech", IEEE Proc. ICASSP, pp 1121–1124, 1985). These models are derived from (nonplace/temporal) auditory nerve models of the human auditory nerve system.

In addition, the wavelet transform (WT) is a widely used time-frequency tool for signal processing which has proved to be well adapted for extracting the modulation laws of isolated or substantially distinct primary components. The WT performed with a complex analysis wavelet is known to carry relevant information in its modulus as well as in its phase. The information contained in the modulus is similar to the power spectrum derived parameters. The phase is partially independent of the amplitude level of the input signal. Practical considerations and intrinsic limitations, however, limit the direct application of the WT for speech recognition purposes.

Parellelisms between properties of the wavelet transform of primary components and algorithmic representations of speech signals derived from auditory nerve models like the EIH have led to the introduction of "synchrosqueezing" measures: a novel transformation of the time-scale plane obtained by a quasi-continuous wavelet transform into a time-frequency plane (i.e., synchrosqueezed plane) (see, e.g., "Robust Speech and Speaker Recognition Using Instantaneous Frequencies and Amplitudes Obtained With Wavelet-Derived Synchrosqueezing Measures", Program on Spline Functions and the Theory of Wavelets, Montreal, Canada, March 1996, Centre de Recherches Mathématiques, Université de Montréal (invited paper). On the other hand, as stated above, in automatic speech recognition, cepstral feature have imposed themselves quasi-universally as acoustic characteristic of speech utterances. The cepstrum can be seen as explicit functions of the formants and other primary components of the modulation model. Two main classes of cepstrum extraction have been intensively used: LPC-derived cepstrum and FFT cepstrum. The second approach has become dominant usually with Mel-binning. Accordingly, a method for extracting spectral features which utilizes these conventional methods for constructing feature vectors which provide increased robustness to speech recognition systems is highly desirable.

SUMMARY OF THE INVENTION

The present invention is directed to systems and methods for processing acoustic speech signals which utilize the wavelet transform (and alternatively, the Fourier transform) as a fundamental tool. The method essentially involves "treating" the wavelet transform (or Fourier transform) of the speech in a very specific way, called "synchrosqueezing." In particular, this impetus of this processing method includes the physiologically motivated auditory nerve model, the ensemble interval histogram (EIH) model, and the modulation model (MM) of speech production, but now all synthesized together within the more concrete framework for generating spectral features.

As is known by those skilled in the art, the EIH representation results from an attempt to exploit the insynchrony phenomena observed in neuron firing patterns (of the human peripheral auditory system) which contain all the information processed by the higher auditory system stages. In general, auditory nerve representations can be modeled as filter banks followed by a dominant frequency extractor. The latter is used to accumulate information from the different subbands along the frequency axis at a given instant of time. The wavelet-based "synchrosqueezed" representation naturally formalizes these models. The cochlear filter bank can be approximated by a quasi-continuous wavelet transform and the second stage is obtained with the time-derivative of the phase of the wavelet transform as the dominant frequency estimator.

In one aspect, a method for extracting spectral features from acoustic speech signals for use in automatic speech recognition, comprises the steps of:

digitizing acoustic speech signals for at least one of a plurality of frames of speech;

performing a first transform on each of the frames of digitized acoustic speech signals to extract spectral parameters for each frame;

performing a squeezing transform on the spectral parameters of each frame by grouping spectral components having similar instantaneous frequencies such that acoustic energy is concentrated at the instantaneous frequency values;

clustering the squeezed spectral parameters to determine elements corresponding to each frame, the location of the elements being determined by cluster centers;

mapping frequency, bandwidth and weight values to each element for each frame of speech;

mapping each element with its corresponding frame; and generating spectral features from the element for each frame.

With this method, the spectral components are, preferably, dynamically tracked via a K-means clustering algorithm from the synchrosqueezed plane. The amplitude, frequency and bandwidth of each of the components are, thus, extracted. The cepstrum generated from this information alone is referred to herein as "K-mean Wastrum."

In another aspect, a method for extracting spectral features from acoustic speech signals for use in automatic speech recognition, comprises the steps of:

digitizing acoustic speech signals for at least one of a plurality of frames of speech;

performing a first transform on each of the frames of digitized acoustic speech signals to extract spectral parameters for each frame;

performing a squeezing transform on the spectral parameters of each frame by grouping spectral components having similar instantaneous frequencies such that acoustic energy is concentrated at the instantaneous frequency values;

clustering the squeezed spectral parameters to determine elements corresponding to each frame, the location of the elements being determined by cluster centers;

mapping frequency, bandwidth and weight values to each element for each frame of speech;

mapping each element with its corresponding frame;

partitioning-the elements of each frame to determine at least one centroid for each frame;

designating the determined centroids as formants;

generating spectral features for each frame of speech from the formants.

With this method, the result of the K-mean clustering process is further processed to limit the set of primary components to formants. The resulting features are referred to as "formant-based wastrum." Formants are interpolated in unvoiced regions and the contribution of unvoiced turbulent part of the spectrum are added. This method requires adequate formant tracking. The resulting robust formant extraction has a number of applications in speech processing and analysis.

These and other aspects, features and advantages of the present apparatus and method will become apparent from the following detailed description of illustrative embodiments, which is to be read in connection with the accompanying drawings.

DETAILED DESCRIPTION OF PREFERRED EMBODIMENTS

It is to be understood that the present invention may be implemented in various forms of hardware, software, firmware, or a combination thereof. In particular, the system modules described herein for extracting and processing spectral features of acoustic speech signals are preferably implemented in software as an application program which is loaded into and executed by a general purpose computer having any suitable and preferred microprocessor architecture. Preferably, the present invention is implemented on a computer platform including hardware such as one or more central processing units (CPU), a random access memory (RAM), and input/output (I/O) interface(s).

The computer platform also includes an operating system and microinstruction code. The various processes and functions described herein relating may be either part of the microinstruction code or application programs which are executed via the operating system. In addition, various other peripheral devices may be connected to the computer platform such as an additional data storage device and a printing device.

It is to be further understood that, because some of the constituent system components described herein are preferably implemented as software modules, the actual connections shown in the systems in the Figures may differ depending upon the manner in which the systems are programmed. Of course, special purpose microprocessors may be employed to implement the system. Given the teachings herein, one of ordinary skill in the related art will be able to contemplate these and similar implementations or configurations of the present system and method.

One goal of the present invention is to estimate the location of the formant frequencies of the acoustic speech signal in a probabilitistic or deterministic manner as a function of time. This goal is based on the fact that visual identification of formants from a spectrogram is a relatively successful art. Thus, as input to the extraction procedure, we have a set of elements for each frame of speech, where associated with each element there is a frame number, a frequency, a bandwidth, and an energy value. The output of the extraction procedure consists, preferably, of four data sets for each element set, the data sets comprising one set for each of the first three formants and one set for noise, which partition the input set. The visual cues used in identifying formants deal with global continuity conditions for the individual components. This, coupled with a physical understanding of the ordering of the formants, can lead to several procedures for determining the formant locations. The effectiveness of the procedure depends on the underlying time-frequency representation. As discussed above, the "synchrosqeezed" representation allows the above elements to be selected in a robust manner. More precisely, the elements that constitute noise are ignored, while those elements which result from resonance (i.e., formants) are retained.

Time-Frequency Derived Cepetra (Wastra)

The term "wastra" (or Wavelet-based Cepstrum) used herein generally refers to as the cepstral feature obtained by applying the "Schroeder" formula (see M.R. Schroeder, Direct (Nonrecursive) Relations Between Cepstrum and Predictor Coefficients, IEEE Trans. ASSP, 29:pp. 297–301, 1981) on generalized poles obtained by tracking the formants or primary components in the synchrosqueezed plane. The application of the synchrosqueezed wavelet transform for speaker identification has proven to provide improved robustness to noise (see "A Nonlinear Squeezing of the Continuous Wavelet Transform Based on Auditory Nerve Models" by I Daubechies and S. Maes, "Wavelets in Medicine and Biology", Chapter 20, pp. 527–546, CRC Press, 1996. Another advantageous result of this technique is that the synchrosqueezed wavelet transform is more amenable to tracking of formants or, more generally, the components of the speech signal. Consequently, different methods can be envisioned for tracking of the components.

In one embodiment of the present invention, the spectral components are dynamically tracked via a K-means clustering algorithm from the synchrosqueezed plane. The amplitude, frequency and bandwidth of each of the components are, thus, extracted. The cepstrum generated from this information alone is referred to herein as "K-mean Wastrum."

In a second embodiment of the present invention, the result of the K-mean clustering process is further processed to limit the set of primary components to formants The resulting features are referred to as "formant-based wastrum." Formants are interpolated in unvoiced regions and the contribution of unvoiced turbulent part of the spectrum are added. This method requires adequate formant tracking.

The resulting robust formant extraction has a number of applications in speech processing and analysis.

Figure 2:
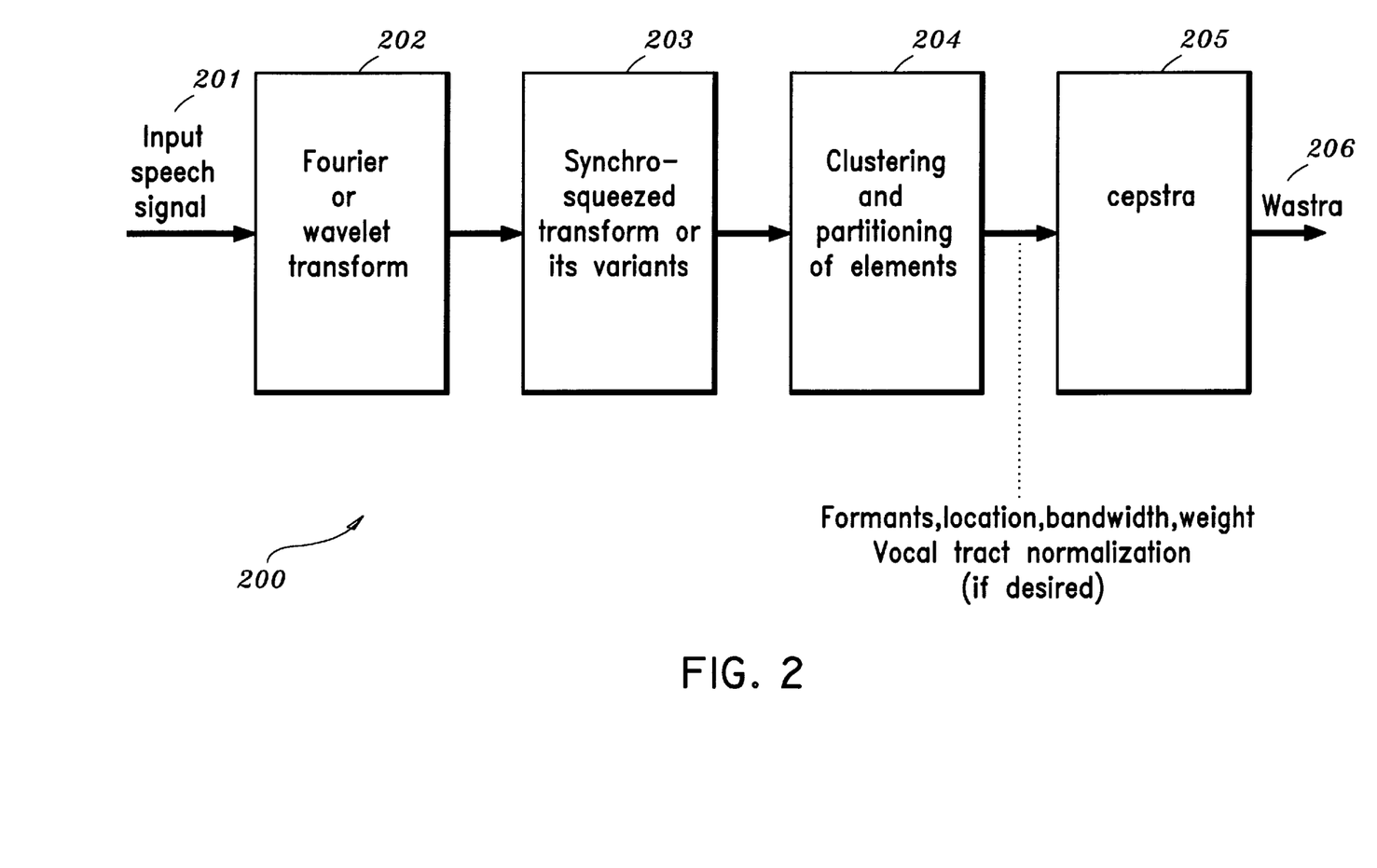
FIG. 2 is a block/flow diagram of a system/method for processing acoustic speech signals in accordance with one aspect of the present invention, which may be implemented in the acoustic front end shown in FIG. 1.

These embodiments will now be discussed in further detail with reference to FIG. 2, which is a block/flow diagram that illustrates a system/method for processing acoustic speech signals. It is to be understood that the present system/method depicted in FIG. 2 is implemented in the acoustic front end 102 of the speech recognition system 100 shown in FIG. 1. In FIG. 2, a digitized speech signal is transformed into a plurality of coefficients (spectral features) which represent the speech signals in time, scale and/or frequency domains via a first transform module 202.

Preferably, the desired spectral features are extracted by the transform module 202 by computing a wavelet transform of the speech signals for each frame of speech. As is known in the art, the wavelet transform of a signal f(t) is computed in accordance with the following formula:

$$(W_\psi f)(a, b) = \int f(t) \frac{1}{\sqrt{a}} \overline{\psi\left(\frac{t-b}{a}\right)} dt$$

where $W_\psi f$ is the wavelet transform, "a" represents the "scale" parameter, "b" represents the "shift" parameter, and where ψ is the generating analysis wavelet. Alternatively, a gliding window Fourier transform may be used for performing a time-frequency analysis of the speech signals in a manner well-known in the art of signal processing (see "Fundamentals of Speech Recognition" by Rabiner et al., Prentice Hall, Englewoods Cliff, .J., 1993.

As is known by those skilled in the art, the "a" and "b" parameters are the basic ingredients of the wavelet transform, whereas the basic parameters of the windowed Fourier transform are time and frequency. The wavelet transform scale parameter "a" is analogous (but not similar) to the Fourier transform frequency parameter, and the wavelet shift parameter "b" is analogous to the time parameter of the Fourier transform. Typically, time-frequency parameters of the windowed Fourier transform are represented by spectrograms whereas wavelet based parameters are typically represented by wavelet-scaled diagrams (i.e, scalograms).

It is to be understood that any conventional method for computing the wavelet transform of the acoustic speech signals may be implemented in the present invention. Preferably, the wavelet transform is computed using with a quasi-continuous wavelet transform (QCWT) algorithm as described in "Signal Analysis And Synthesis With 1-D Quasi-Continuous Wavelet Transform" by S. Maes, Proc. 12th International Conference on analysis and optimization of systems, Paris, June, 1996 IRSIA, and "Fast Quasi-Continuous Wavelet Algorithms For Analysis and Synthesis of One-Dimensional Signals", by S. Maes, Society for Industrial and Applied Mathematics. vol. 57, No.6, pp. 1763–1801, December, 1997, which are incorporated herein by reference. The QCWT if is, by definition, a discrete time transform with no downsampling along the time axis and the possibility of selecting any sampling grid along the scale axis of the wavelet scalogram.

The data output from the first transform module 202 is further process via a second transform module 203.

The second transform module 203 performs a synchrosqueezing transform on the data obtained via the first transform module 202. This "synchrosqeezing process" is necessitated by the somewhat "de-focussed" nature (i.e., the smearing out of the different harmonic components) of the wavelet transform in the time-scale plane and the Fourier transform of speech signals in the time-frequency plane. The underlying theory for the "synchrosqeezing transform" is discussed in "A Nonlinear Squeezing of the Continuous Wavelet Transform Based on Auditory Nerve Models" by I Daubechies and S. Maes, "Wavelets in Medicine and Biology," Chapter 20, pp. 527–546, CRC Press, 1996, which is incorporated by reference. This process is summarized as follows. From the wavelet transform parameters (i.e., scale "a" and shift "b"), frequency or frequency-like objects (pseudo-frequencies) can be obtained such that the speech characteristics may be visualized in a manner similar to the conventional spectrogram. For this purpose, the modulation model MM discussed above is utilized. Under the assumption that this model is satisfactory for representing speech signals, the pseudo frequency w can be estimated as the derivative of the phase of the wavelet transform with respect to the shift parameter:

$$w(a, b) = \frac{d}{db} \phi W_\psi f(a, b)$$

The information from the (a,b) plane of the wavelet transform can then be transformed to a (b,w) plane (the "synchrosqueezed representation") by selecting suitable nonlinear transforms. It is to be understood that many variants of the "synchrosqueezed representation" are possible. Examples of such variants are the nonlinear transforms described by the following equations:

$$(S_\psi f)(b, w_1) = \sum_{a_k \text{ such that } |w(a_k, b) - w_1| \leq \frac{\Delta w}{2}} |W_\psi f(a_k, b)|$$

and $$(S_\psi f)(b, w_1) = \sum_{a_k \text{ such that } |w(a_k, b) - w_1| \leq \frac{\Delta w}{2}} W_\psi f(a_k, b) a_k^{-\frac{3}{2}}$$

where, "$a_k$" represents the discretized scale parameter, "b" represents the shift parameter, "w" represents the (pseudo) frequency and Δw is the incremental (pseudo) frequency.

Essentially, the "synchrosqueezed transform" transforms (or squeezes) a two dimensional plane into another two-dimensional plane in a nonlinear fashion. The planes under consideration could have different interpretations. For example, one may be the time-frequency plane (the spectrogram for speech), the shift-wavelet transform plane (the scalogram for speech) or still other planes of interest having different physical interpretations. The transformation could be invertible or noninvertible. In the former case, all the information in the original plane can, in principle, be recovered, from the transformed data, in spite of inherent nonlinearity of the technique, thus causing no loss of information. The non-invertible versions of the synchrosqueezing transform, however, do not have the property of reconstructibility of the original data from the transformed data. Although, in principle, this can lead to some loss of information, in practice, such non-invertible versions may be more desirable due to the fact the transformed data may have more pronounced features of interest (this of course depends on the application), such as when the information loss occurs in domains of secondary importance. This clearly depends on the "design" of the synchrosqueezed transform and its subsequent use in the processing, the details of which are all left open to the practitioner as described in the above reference.

Referring again to FIG. 2, the wavelet transform (as well as the Fourier Transform) computed by the first transform module 202 provides ea "blurred" time-frequency data. Therefore, the second transform module 203 operates to "squeeze" back the defocused information in order to gain a sharper picture by transforming to a different time-frequency plane by reassigning contributions with the same instantaneous frequency to the same bin, with a larger weight being given to components with a large amplitude.

Figure 5A:
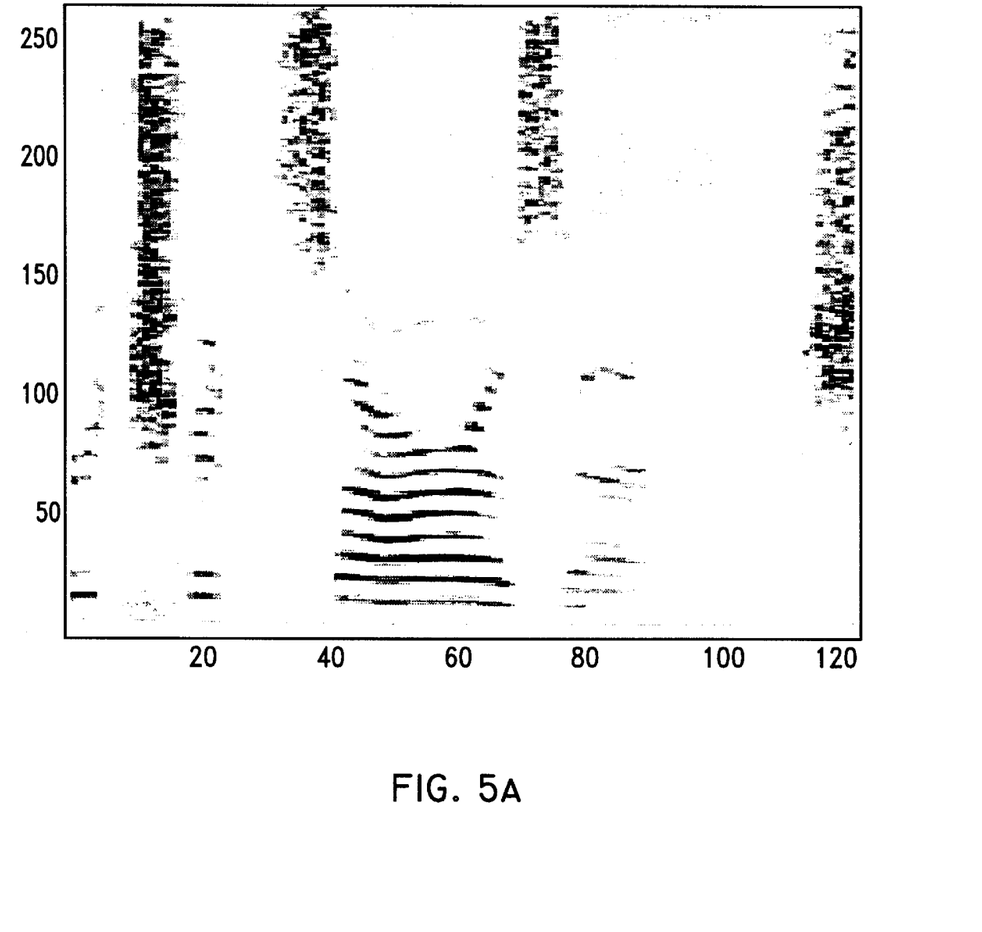
FIGS. 5a and 5b are diagrams illustrating the time-frequency spectrogram for a segment of speech resulting from an FFT transform and a schrosqueezed transform, respectively.
Figure 5B:
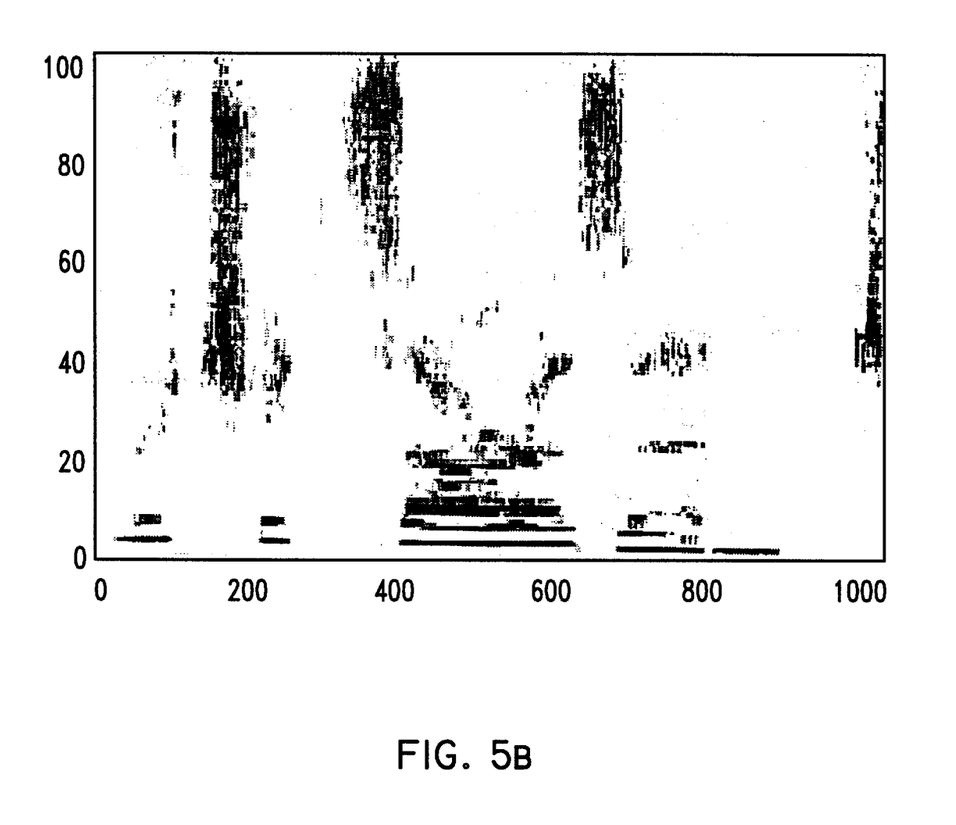

As discussed above, one of the many advantages of the present invention is that synchrosqueezed transform is more amenable to tracking of formants (i.e., resonant frequencies of the vocal tract) or, more generally, the components of the speech signal. The time varying nature of the amplitude, bandwidth and the frequency content of the speech, as described, for example, in the modulation model, is thus, captured in this process. Referring now to FIG. 5, a comparison is illustrated between the time-frequency representation obtain by wavelet-based synchrosqueezing and FFT spectrograms for a given segment of speech from the Wall-Street-Journal data base. In particular, FIG. 5a represents the time-frequency plane (spectrogram) for a certain segment of speech (i.e.,Richard Sarazen . . . ) processed via a fast fourier transform (FFT) with frames shifts of 10 ms and Hamming windows of 25 ms. FIG. 5b, illustrates the corresponding synchrosqueezed plane. It is apparent that besides the role of the window sizes, the synchrosqueezed approach extracts coherent structures within the signal, while the FFT method represent anthe harmonics independently of the mutual interferences. For this reason, the synchrosqueezed representation allows the primary components and formants to be efficiently and robustly tracked.

Referring again to FIG. 2, in one embodiment of the present invention, formant tracking is performed via a clustering module 204 by processing the "synchrosqueezed" data from the second transform module 203. In particular, the clustering module 204 generates data which represents the location, bandwidth and weight for the formants for each frame of speech. Although one of skill in the art can envision different methods for tracking these components, the present method for tracking components is based on a simple and computationally tractable scheme, which has the flavor of carrying out (K-means) clustering of the synchrosqueezed spectrum dynamically in time.

Figure 3A:
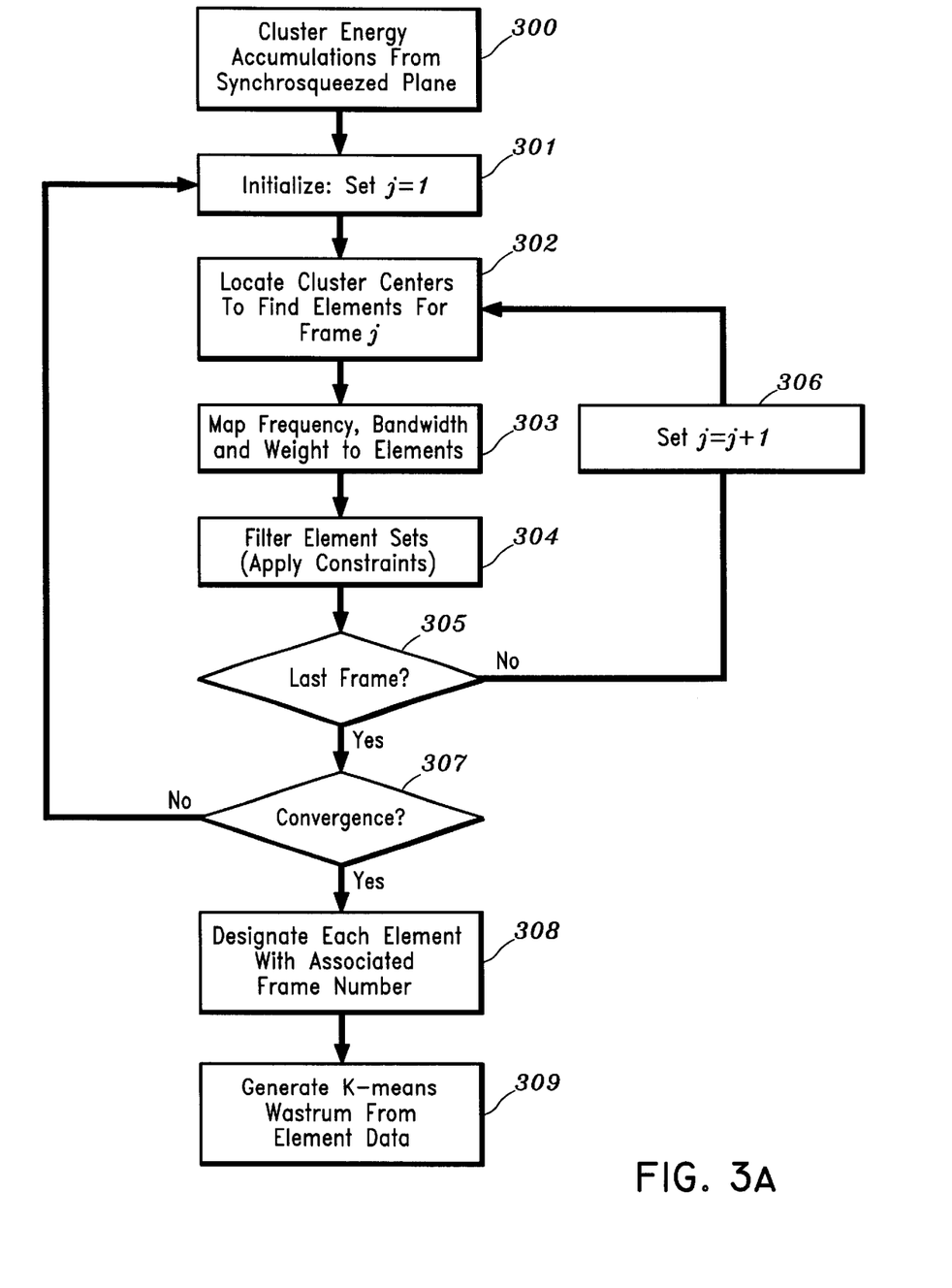
FIG. 3a is a flow diagram illustrating a method for generating cepstral features in accordance with one aspect of the present invention, which may be implemented in the clustering module shown in FIG. 2.

Referring now to FIG. 3a, a flow diagram illustrates a method for generating cepstral features in accordance with one aspect of the present invention. The method depicted in FIG. 3a may be implemented in the clustering module 204 of FIG. 2. It is to be appreciated that this method is particularly applicable for processing "synchrosqeezed data" (i.e., the synchrosqeezed plane), since, as discussed above, representation in this plane has the property that energy is concentrated at the formants.

Initially, in order to find the corresponding "elements" of each frame, a clustering process is performed on the synchrosqueezed plane to cluster the synchrosqueezed energy data generated by the second transform module 203 for each frame of speech signals (step 300). It is to be appreciated that any conventional clustering algorithm may be used for this purpose such as the conventional K-means clustering method. Other conventional unsupervised clustering algorithm may be used such as the "peak detection" method. This method involves computing the maxima (peak detection) by first computing a smooth version of the data using, for example, spline interpolation or any other curve fitting of the data, and then determining the maxima by computing zeros of its derivative (see Anil Jain and R Dubes, "Algorithms for Clustering Data," Prentice Hall, 1988).

Next, for the first frame of speech data (i.e., frame j=1) (step 301), the elements are determined by the locating the cluster centers that are computed via the clustering process (step 302). That is, each of the cluster centers for a given frame of speech are designated as the frame elements. The results of step 301 is that a set E of N elements is generated for the given frame (E={e_i}, i=1,2, . . . N). Physically, the elements refer to the components of the modulation model:

$$f(t) = \sum_{k=0}^{N} A_k(t)\cos[\theta_k(t)] + \eta(t)$$

In particular, each cosine term on the right hand side of the above formula is an "element", whereby the total number of elements is "N" according to the above formula. It is to be understood that the number of elements can differ from frame to frame (e.g., some $A_k$'s may be zero) The number of elements is an important byproduct of the clustering algorithm such that the number of clusters is equal to the number of elements.

Next, each element (in set E) for the given frame is associated with a frequency, bandwidth and weight (i.e., the functions f(.), b(.) and w(.) be maps: E→R, which map a given frequency, bandwidth and weights for each of the elements) (step 303). In determining this set E, energy and bandwidth constraints may be imposed via a filtering process (step 304). Specifically, each element of set E is filtered based on threshold values for frequency, bandwidth and weights to generate a filtered element set E'. These thresholds are preferably determined such that, for each frame of speech, the filtering process produces elements that are representative of at least the first 3 dominant formants and some noise. Particularly, these thresholds can change, as the iteration of the algorithm progresses (as discussed further below). However, the range in which these thresholds are constrained may be based on prior knowledge regarding the location of the first 3 or 4 dominant formants. This is based on conventional wisdom that each sound has an aggregation of formants (pronounced frequencies) and that the first 3 or 4 dominant formants for each uttered sound carry virtually all the intelligible auditory information of speech.

Next, a determination is made as to whether every frame has been processed to find corresponding elements (step 302). If not, the elements of the next successive frame (step 306) are determined (by repeating steps 302–304). Once the elements for the last frame have been determined (affirmative result in step 305), a determination is made as to whether convergence has been obtained (step 307). In particular, the clustering process for determining the element location for each may be repeated several times until no appreciable change occurs for the cluster locations of each frame (i.e., repeating steps 301–306 until the process has "converged" or "stabilized" in a practical sense).

Once a stable partition is realized (affirmative result in step 307), each element (or each element that remains after filtering) is designated a corresponding frame number (i.e., the function t(.): E→R maps a frame number to each element) (step 308).

Next, the resulting amplitude, frequency and bandwidth data (i.e., elements) is used to compute the K-means Wastrum (cepstrum) via the cepstra module 205 (FIG. 2) (step 309). Preferably, the cepstrum is computed using the "Schroeder" formula (see M. R. Schroeder, Direct (Nonrecursive) Relations Between Cepstrum and Predictor Coefficients, IEEE Trans. ASSP, 29:pp. 297–301, 1981) on generalized poles, which is incorporated herein by reference. In particular, the cepstrum coefficients may be determined by the following formula:

$$c_n(t) = \frac{1}{n}\sum_{k=1}^{K} A_k [z_k(t)]^n$$

where $$Z_k(t) = e^{t[w_k(t) + i\Delta w_k(t)]}$$

To be specific, assume there are 3 formants f_1, f_2, and f_3. Associated with each of these formants is a (center) frequency, a bandwidth, and a weight (these are, respectively, frequency of resonance, sharpness of resonance and strength of resonance). From these, one can derive a first or 2nd order transfer function (where the poles would be the center frequency) that resonates at the center frequency of the formant with the associated bandwidth. This is a conventional digital resonator design problem known by those skilled in the art (see "Digital Signal Processing", Oppenheim et al.). Once the transfer function of each of the 3 resonators (e.g. for $f\_1$, $f\_2$ and $f\_3$) are obtained, we consider a weighted sum of these to get a complete transfer function (which in principle is supposed to model the vocal tract for that 10 ms frame of speech). From this latter transfer function, computation of cepstra is a direct computed (see (see "Fundamentals of Speech Recognition" by Rabiner et al., Prentice Hall, Englewoods Cliff, N.J., 1993)

Other conventional clustering methods similar to the above K-means clustering method may be used for computing the K-means wastra. Such methods may be found in the above reference "Algorithms for Clustering Data," by Dubes et al.

Figure 6A:
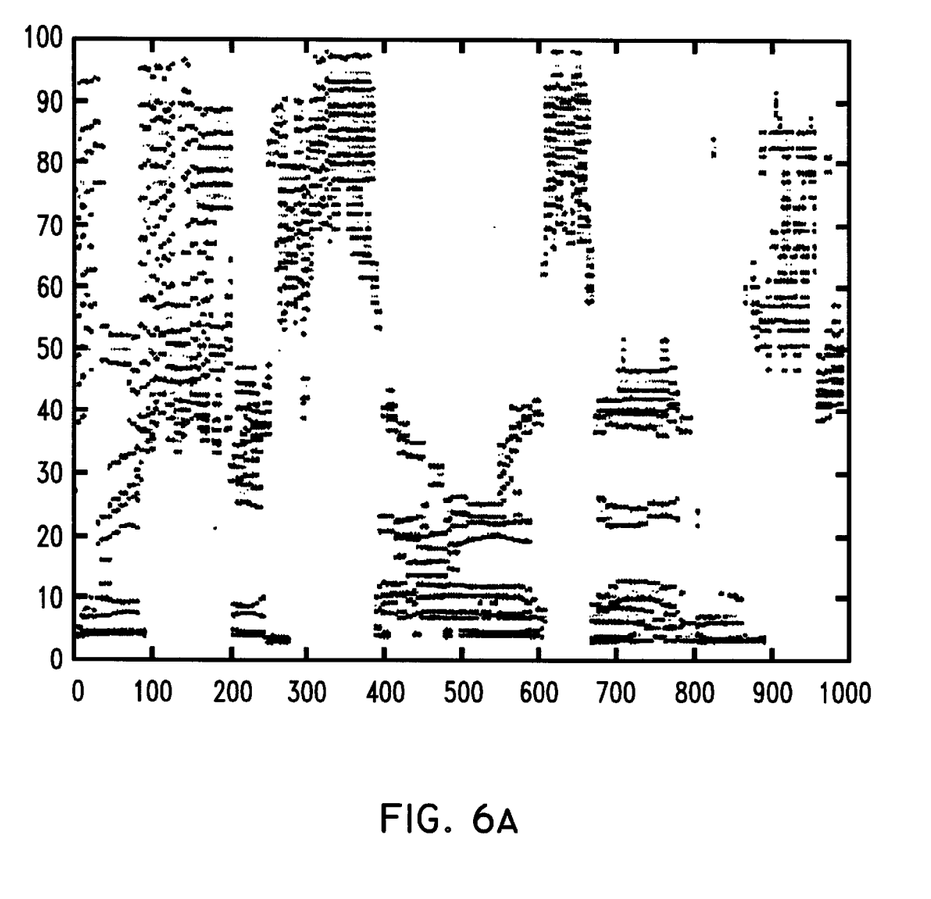
FIGS. 6a and 6b are diagrams illustrating components extracted by the K-means approach, and the resulting K-means wastrum for a given segment of speech in accordance with one aspect of the present invention.
Figure 6B:
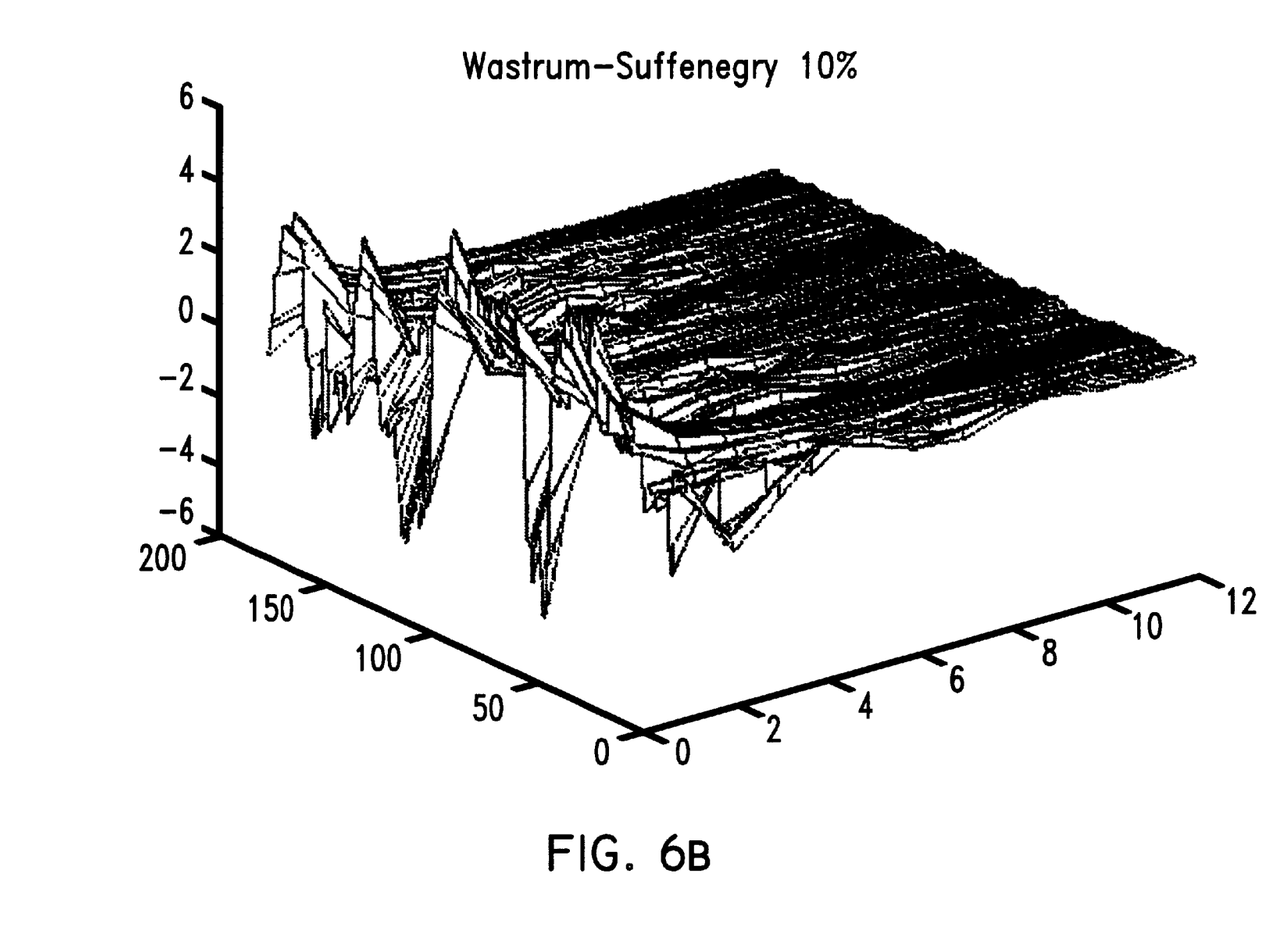
Figure 7:
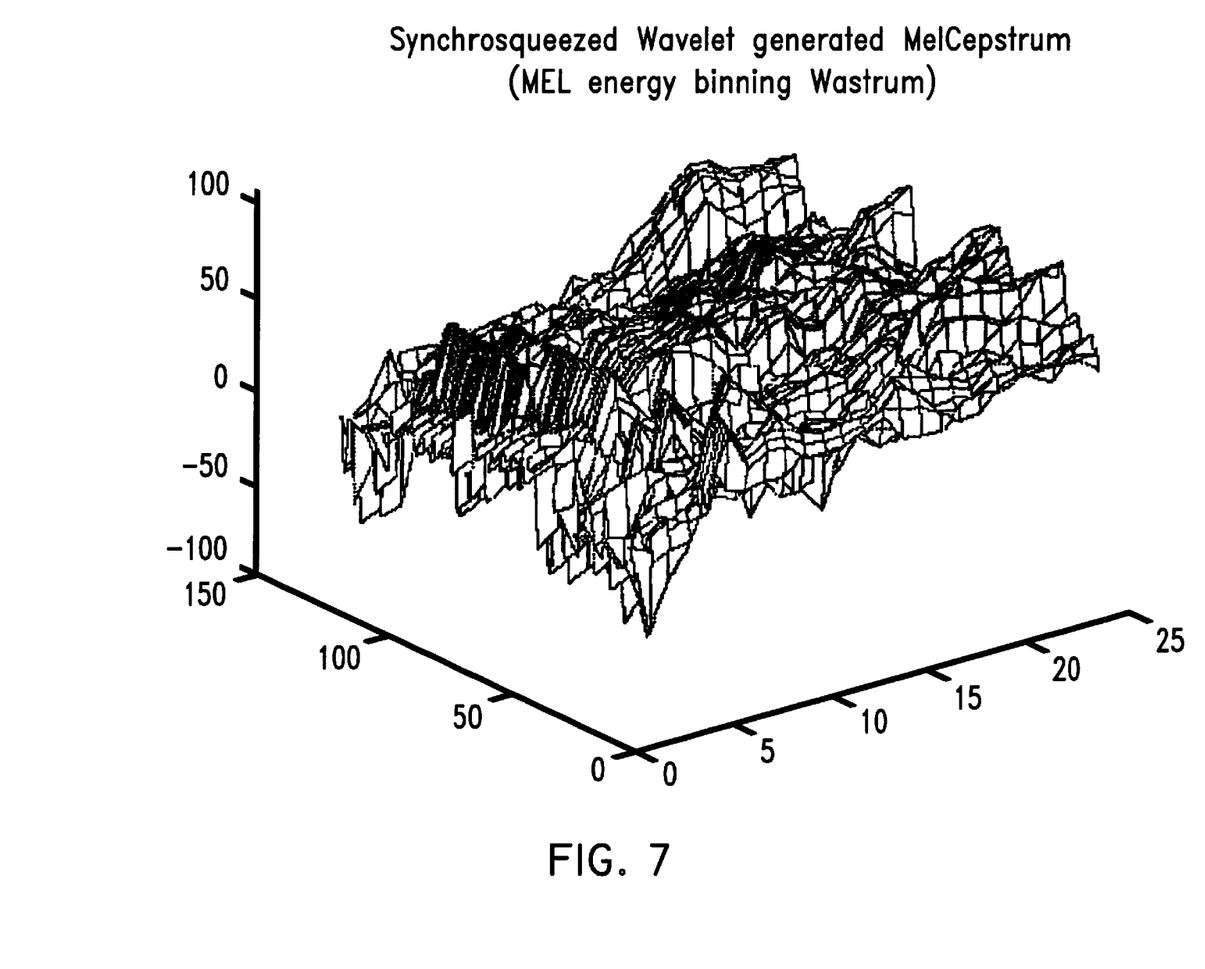
FIG. 7 is a diagram illustrating MEL energy binning wastrum for a given segment of speech in accordance with one aspect o e present invention.

FIGS. 6a and 6b illustrate the center frequencies and bandwidths and the resulting cepstrum, respectively for a certain segment of speech (Richard Sarazen . . .). In particular, FIG. 6a illustrates the components extracted by the K-mean approach and FIG. 6b presents the resulting K-mean wastrum. As is evident, from FIG. 6a, the dynamics of the formants as they are tracked in time is clear as a result of the application of the algorithm. FIG. 6b shows the corresponding wastrum, which may be compared and contrasted with the Mel energy binning cepstrum of FIG. 7. They are substantially different which illustrates that the resulting feature spaces are quite different for the same segment of speech.

Figure 3B:
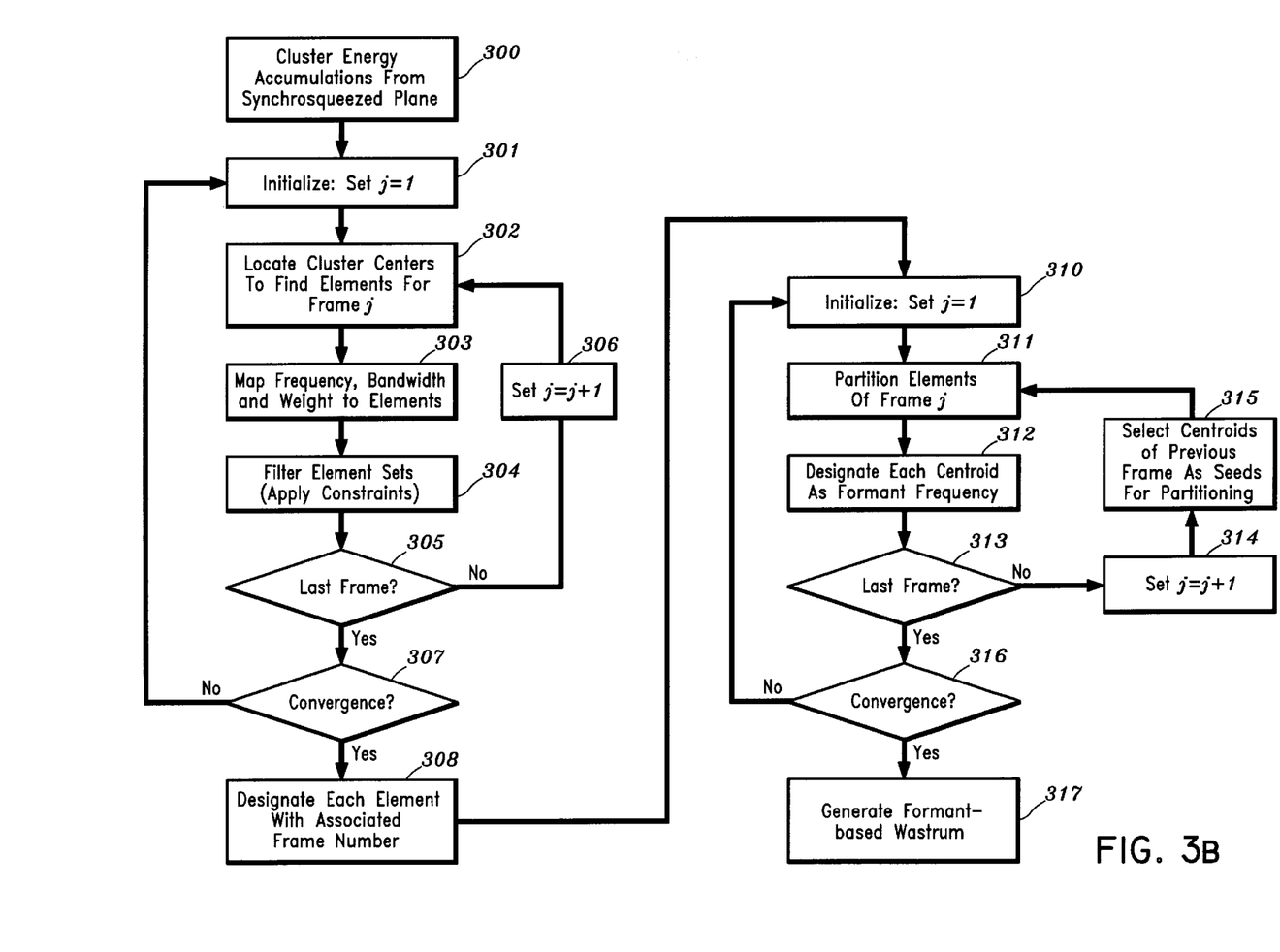
FIG. 3b is a flow diagram illustrating a method for generating cepstral features in accordance with another aspect of the present invention, which may be implemented in the clustering module shown in FIG. 2.

Referring now to FIG. 3b, a flow diagram illustrates a method for generating cepstral features in accordance with another aspect of the present invention. In the method depicted in FIG. 3b, the element data is further processed to produce the formant based wastrum. In particular, the process for generating the element data (steps 300–308) is similar to the process discussed above with respect to FIG. 3a. But instead of generating K-means wastrum from the element data (such as the method of FIG. 3a), the frequency, bandwidth and weight data (i.e., element data) may be used to compute initial estimates of, and extract, the dominant formants by clustering and partitioning the elements into corresponding formants. The centroids of the clusters (as obtained e.g., from the k-means algorithm or otherwise) becomes the formant frequencies. This process will now be discussed in further detail.

Initially, the first filtered element set E' for associated with the first frame is selected (step 310) and its elements are partitioned (step 311). Specifically, starting from $E\_1=\{e\_i$ in E': $t(e\_i)=1\}$, the elements are partitioned into sets ordered, e.g., by their centroids. Each centroid is designated as a formant frequency $f\_1$, $f\_2$, etc (step 312). The next successive frame is selected (steps 313 and 314) and its elements are partitioned by selecting the centroids (formant frequencies) of the previous frame as the initial seeds for partitioning (step 315 and step 311). That is, the set $E\_2=\{e\_i$ in $E\_1$: $t(e\_i)=2\}$ is considered and its elements are distributed among sets derived from $E\_1$ or additional sets created as necessary. This process is continued for all frames. To elaborate, the process begins from an initialization E' for frame 1. The clustering is performed for frame 2 by choosing the centroids for frame 1 as the seeds. Similarly, for frame 3, the centroids of frame 2 are chosen as the seed for clustering, and so on. After an entire pass of the utterance is made (affirmative result in step 313) (i.e., all frames are exhausted), the entire process can be repeated commencing with frame 1 (possibly with filtered versions of $f\_1$, $f\_2$ etc for each frame) until convergence has been obtained (step 316). In particular, the partitioning process for tracking formants for each frame may be repeated several times until no appreciable change occurs for the centroids (formants) of each frame (i.e., repeating steps 310–316 until the process has "converged" or "stabilized" in a practical sense).

Once a stable partition is realized (affirmative result in step 316), the formant-based wastrum (cepstrum) is computed via the cepstra module 205 (FIG. 2) (step 317). Preferably, the cepstrum is computed using the "Schroeder" formula (see M. R. Schroeder, "Direct (Nonrecursive) Relations Between Cepstrum and Predictor Coefficients") as discussed above.

The movement of formants with time as, for example, in diphthongs give rise to potential discontinuities in the formant tracks so obtained. These discontinuities can in turn be smoothed out by using appropriate smoothing techniques (e.g., by moving some elements to intermediate locations for frames belonging to the region of transition). Accordingly, any suitable conventional smoothing step may be included in the method of FIG. 3b immediately prior to the step of generating the cepstrum (i.e. step 317).

It is to be appreciated that an additional step of vocal tract normalization may be applied in the method of FIG. 3b. Particularly, as is known by those skilled in the art, differences in vocal tract size contribute significantly to the speech waveform variability, causing automatic speech recognition systems to suffer degradation, when the system is trained on one speaker and tested on another with different vocal tract characteristics. One conventional method of alleviating this difficulty is to estimate the (normalized) vocal track lengths from the third formant frequencies of different speakers and thus cancel out this effect. This is a procedure that has seen limited success due to the nonrubustness of conventional LPC-based and other standard estimates of formant frequencies, and also due to the fact the relationship between the vocal tract geometry and the formant frequencies are very complex. Consequently, the method of FIG. 3b can be utilized to compute the formant frequencies $f\_1$, $f\_2$ and $f\_3$ for each frame of speech (as described in detail above). Particularly, centroids can initially be computed over all these values. Once the stable clusters are computed, centroids are computed as the weighed means of the data belonging to the cluster. This is a byproduct of the k-means clustering algorithm (assuming it is the algorithm used for clustering). Next, discrepancies among speakers can be corrected by appropriately warping the frequency scale. One technique for performing normalization is as follows. Let $f\_o$ be the 3rd formant frequency of a nominal speaker, and $f\_t$ be the 3rd formant frequency of a test speaker. Then all the frequency components of the data associated with the test speaker can be brought "close" to the nominal speaker by the process of normalization of scaling the frequencies by a multiplicative factor of $(f\_o/f\_t)$. Accordingly, synchrosqueezing techniques as applied to formant extraction can be used in speaker normalization (or vocal tract normalization) as well.

Energy Accumulation-Derived Cepstra and Wastra

It is to be appreciated that, in accordance with further embodiments of the present invention, the wavelet transform (discussed above) can be utilized in various manners to extract cepstral features. For instance, in one embodiment, Mel frequency binning of the pseudo-frequency and amplitude estimated from the raw wavelet transform and resulting cepstra may be used as features for recognition. In another embodiment, energy binning may be applied to the synchrosqueezed plane, whereby, instead of using data from the raw wavelet transform, data from the synchrosqueezed time-frequency plane is used.

Figure 4:
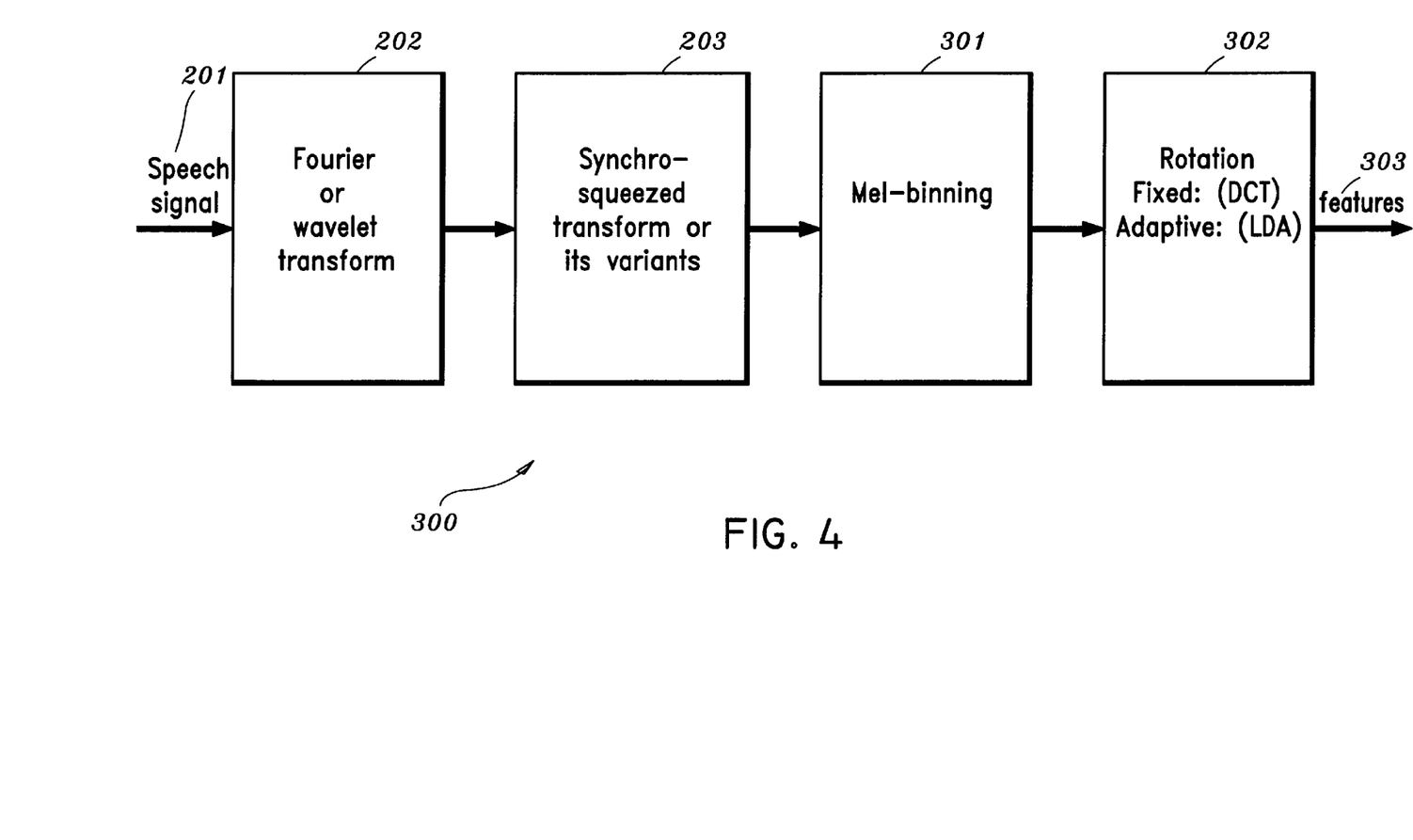
FIG. 4 is a block/flow diagram of a system/method for processing acoustic speech signals in accordance with another aspect of the present invention, which may be implemented in the acoustic front end shown in FIG. 1.

These embodiments will now be discussed in further detail with reference to the block/flow diagram of FIG. 4. In the system of FIG. 4, the first and second transform modules 202 and 203 are similar to the modules discussed above with reference to FIG. 3. However, Mel binning 301 is applied to the synchrosqueezed data to cluster (assign to corresponding frequency bins) the data in accordance with the weighted average of frequency samples. Mel-binning is a method well known in the art (see "Fundamentals of Speech Recognition" by Rabiner et al., Prentice Hall, Englewoods Cliff, .J., 1993) which is used to produce a series of N dimensional feature vectors. A rotation module 302 may be applied to further process the feature data resulting from Mel-binning so as to "decorrelate" the N parameters comprising each of the feature vectors as is known in the art. Various conventional methods such as Discrete Cosine Transform or Linear Discriminant Analysis (LDA) may be utilized for this purpose. Details regarding the LDA and DCT methods are disclosed in "Pattern classification and scene analysis" by P. O. Duda and P. E. Hart, Wiley New York, 1973, and "Fundamentals of Speech Recognition" by Rabiner et al., respectively.

Figure 8:
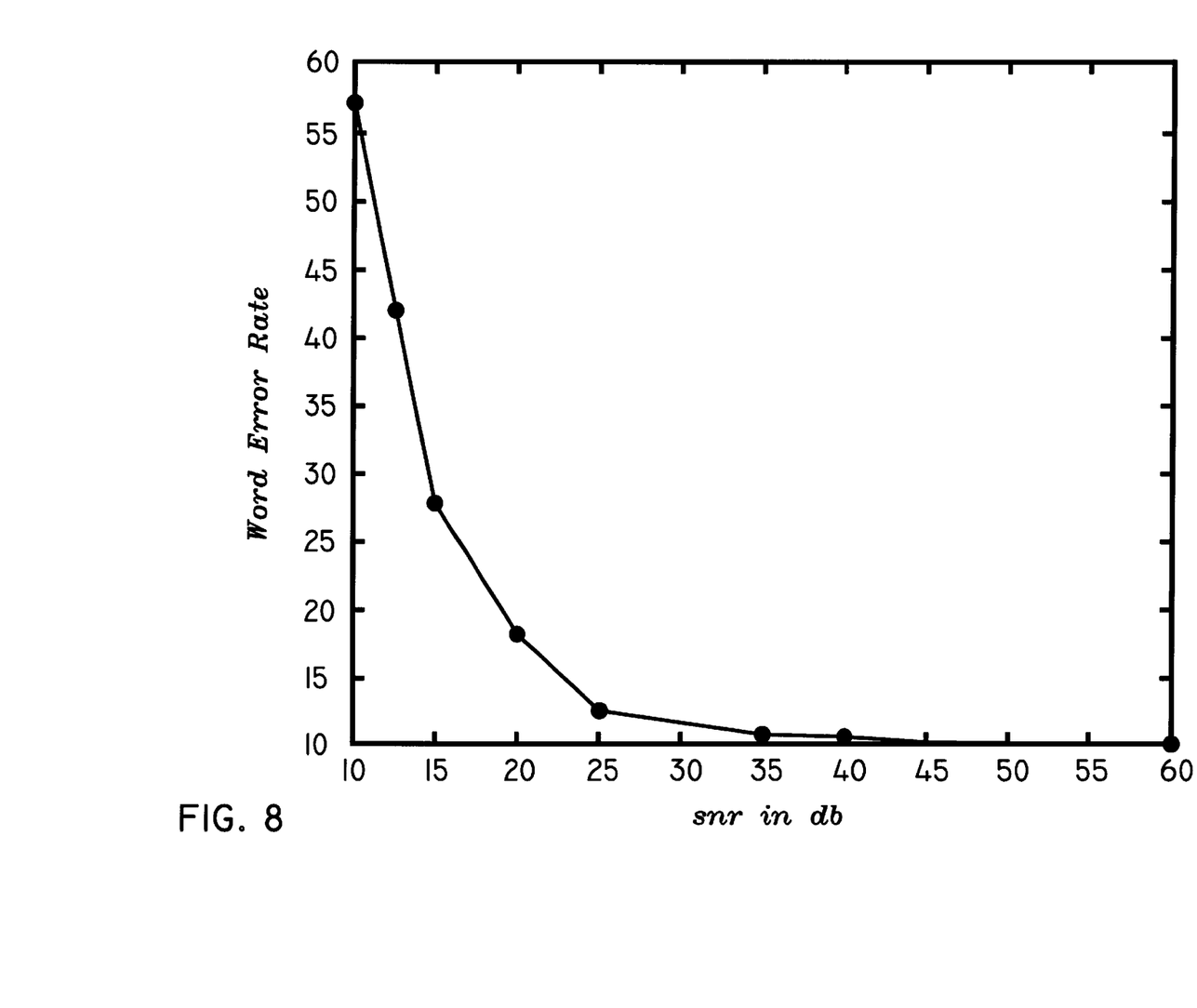
FIG. 8 is a diagram illustrating test results for automatic speech recognition using the cepstrum derived in accordance with one aspect of the present invention.

To demonstrate the efficacy of the wavelet based synchrosqueezed technique in automatic recognition of speech we consider 20 hours of read speech sampled at the rate of 16 Khz from the wall-street-journal database. We computed the energy binning synchrosqueezed wavelet cepstrum corresponding to a frame rate of 10 ms and a frame size of 25 ms. The cepstrum was then used for decoding the 40 test sentences from the wall-street-journal database. To test the performance of the algorithm in presence of noise, we mixed the clean test signal with cafeteria noise a noise levels from very noisy (10 db SNR) to relative clean (60 db SNR). The results are tabulated in Table 1 below. The drop of recognition rate with increase in noise level is also diagrammatically shown in FIG. 8. Note that training was performed on clean uncorrupted signal for the purpose of these experiments. An obvious way to further improve these results is to train on noise corrupted training data at an appropriate SNR level. Further tuning of the parameters such as the window size and frame rate appropriate for this specific front end processing are also necessary for improved performance. In our experiments these parameters were chosen to be the same as the best known values for FFT based cepstra. These results reported in Table 1 below and FIG. 8, definitively illustrate the robustness of wavelet based synchrosqueezed cepstrum.

TABLE 1

Word Error rate (WER) as a function af SNR

| WER | 10    | 12.5  | 15    | 20    |
|-----|-------|-------|-------|-------|
| SNR | 57.04 | 41.99 | 27.7  | 18.2  |
| WER | 25    | 35    | 40    | 60    |
| SNR | 12.6  | 10.84 | 10.43 | 10.08 |

Although illustrative embodiments have been described herein with reference to the accompanying drawings, it is to be understood that the present system and method is not limited to those precise embodiments, and that various other changes and modifications may be affected therein by one skilled in the art without departing from the scope or spirit of the invention. All such changes and modifications are intended to be included within the scope of the invention as defined by the appended claims.

What is claimed is:

1. A program storage device readable by machine, tangibly embodying a program of instructions executable by the machine to perform method steps for extracting spectral features from acoustic speech signals for use in automatic speech recognition, said method steps comprising:

digitizing acoustic speech signals for at least one of a plurality of frames of speech;

performing a first transform on each of said frames of digitized acoustic speech signals to extract spectral parameters for each frame;

performing a squeezing transform on said spectral parameters of each frame by grouping spectral components having similar instantaneous frequencies such that acoustic energy is concentrated at the instantaneous frequency values;

clustering said squeezed spectral parameters to determine elements corresponding to each frame, the location of the elements being determined by cluster centers resulting from said clustering;

mapping frequency, bandwidth and weight values to each element for each frame of speech;

mapping each element with its corresponding frame; and generating spectral features from said element for each frame.

2. The method of claim 1, further including the step of applying constraints to filter said elements having values that fall below a determined threshold.

3. The method of claim 1 further comprising the step of iteratively performing said clustering step in order to obtain convergence of said cluster centers for each frame.

4. The method of claim 1, wherein said first transform step is performed using a windowed Fourier transform.

5. The method of claim 1, wherein said first transform step is performed using a wavelet transform.

6. The method of claim 5, wherein said wavelet transform is implements as a quasi-continuous wavelet transform.

7. The method of claim 1, wherein said clustering step is performed using K-means clustering.

8. The method of claim 1, wherein said spectral features are generated by processing said element data with Schroeder's formula.

9. A program storage device readable by machine, tangibly embodying a program of instructions executable by the machine to perform method steps for extracting spectral features from acoustic speech signals for use in automatic speech recognition, said method steps comprising:

digitizing acoustic speech signals for at least one of a plurality of frames of speech;

performing a first transform on each of said frames of digitized acoustic speech signals to extract spectral parameters for each frame;

performing a squeezing transform on said spectral parameters of each frame by grouping spectral components having similar instantaneous frequencies such that acoustic energy is concentrated at the instantaneous frequency values;

clustering said squeezed spectral parameters to determine elements corresponding to each frame, the location of the elements being determined by cluster centers resulting from said clustering;

mapping frequency, bandwidth and weight values to each element for each frame of speech;

mapping each element with its corresponding frame;

partitioning the elements of each frame to determine at least one centroid;

designating said determined centroids as formants;

generating spectral features for each frame of speech from said formants.

10. The method of claim 9, further comprising the step of iteratively performing said partitioning step in order to obtain convergence of said centroids for each frame.

11. The method of claim 9, wherein said first transform step is performed using a windowed Fourier transform.

12. The method of claim 9, wherein said first transform step is performed using a wavelet transform.

13. The method of claim 9, further comprising the step of selecting centroids for a previous frame as seeds for partitioning a successive frame.

14. A system for processing acoustic speech signals, comprising:

means for digitizing input acoustic speech signals, said input acoustic speech signal being divided into a plurality of successive frames;

first transform means for transforming said digitized speech signal of each frame into a plurality of spectral components;

synchrosqueezing transform means for assigning each of said spectral components for each frame into a corresponding one a plurality of pseudo-frequency groups, said pseudo-frequency groups being representative of primary spectral components for each frame of speech; and mel binning means for clustering said synchrosqueezed data in each frame to produce a feature vector having n-parameters for each frame.

15. The system of claim 14, further comprising decorrelation means for processing the feature vector for each frame by decorrelating the n parameters comprising the feature vector.

16. The method of claim 15, wherein said decorrelation means is implemented as one of a linear discriminant analysis algorithm and a discrete cosine transform algorithm.

17. The method of claim 14, wherein said first transform means is a wavelet transform.

18. A system for processing acoustic speech signals, comprising:

means for digitizing input acoustic speech signals, said input acoustic speech signal being divided into a plurality of successive frames;

first transform means for transforming said digitized speech signal of each frame into a plurality of spectral components;

synchrosqueezing transform means for assigning each of said spectral components for each frame into a corresponding one a plurality of pseudo-frequency groups, said pseudo-frequency groups being representative of primary spectral components for each frame of speech;

means for clustering said squeezed spectral parameters to determine elements corresponding to each frame, the location of the elements being determined by cluster centers resulting from said clustering;

and cepstra generating means for generating feature vectors from said elements.

19. The system of claim 18, further comprising means for partitioning the elements of each frame to determine formants for each frame, the formants being equal to centroids computed by said partitioning means, whereby said formants are used by said cepstra generating means to produce feature vectors.

20. The system of claim 19 wherein said cepstra is generated using Schroeder's formula.

* * * * *